March 28, 1950     J. B. SMITH     2,502,351

PIPE COUPLING

Filed May 8, 1946

*INVENTOR.*
JOSEPH B. SMITH
BY
Oberlin & Limbach
ATTORNEYS

Patented Mar. 28, 1950

2,502,351

UNITED STATES PATENT OFFICE 2,502,351

PIPE COUPLING

Joseph B. Smith, Cleveland, Ohio, assignor to The Standard Oil Company, Cleveland, Ohio, a corporation of Ohio Application May 8, 1946, Serial No. 668,225

2 Claims. (Cl. 285—196)

Where pipe ends have to be connected without the aid of screw threaded couplings or flanges, special handicaps occur. Particularly in the larger range of sizes and in the making of repairs on piping, difficulties in holding and in securing tightness against leaks are general. If the installation is to include welding, there are added hazards. In accordance with the present invention, connections may be made in varied sizes of pipe, with rapidity, and in temporary or permanent form; and, for instance, if a repair is to be made on an oil or gas pipe line or any situation involving possible presence of inflammable vapors, a welding torch or arc can be operated with safety about connnections as involved in the present procedure. Other objects and advantages of the invention will be apparent from the following description.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Figure 1:
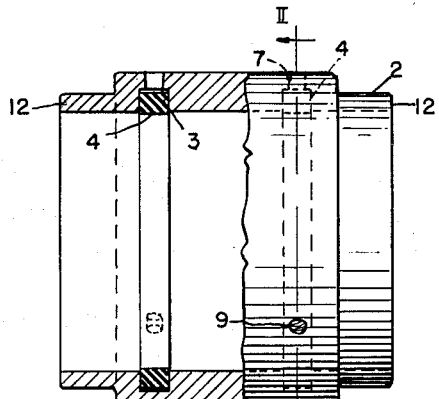
Fig. 1 is a side elevational view, partly in section, of a coupling sleeve in accordance with the invention.

A cylindrical member or sleeve 2 of suitable metal, usually steel, is provided with internal grooves 3, spaced apart axially, and in these grooves compressible annular members 4 are arranged, these being capable of being forced into tight compression against the pipe surface within. Thus, with two pipe ends 5, 6, brought into alignment with such sleeve 2 thereabout, as indicated at Fig. 3, the compressible rings 4 may be tightened down against the pipe surfaces, thereby sealing off escape of fluid from the pipe. The material of the compressible rings is desirably of elastomer character, and depending upon the material to be carried in the pipe, may vary somewhat. While rubber may be suitable in the case of water lines for oil or gasoline or gas lines a polymerized chlor-derivative of vinylacetylene, as for example the commercial product "neoprene" is preferred. The size of the ring is such as to fit the side walls of the groove 3, and compression pressure is applied to the outer surface of the rings through a suitable opening or openings in the metal sleeve. Thus, as in Fig. 2, there are three openings 7, 8, 9, for instance, and the precise number may vary in accordance with the size of the pipe and the pressure conditions within, etc. The openings 7 etc., by being screw threaded, can receive an injecting connection or sealing plugs. With the assembly of the sleeve 2 on the pipe ends, as indicated, a forcing pump is connected through a needle valve 10, to force a pressure medium against the external face of the compression ring. The forcing pump may be on the order of the high pressure grease-dispensing pumps such as are used in high pressure auto lubrication and in lubrication of some machinery, or a high pressure screw-down forcer. The pressure available may desirably, for instance, be on the order of 5,000 to 10,000 lbs. per square inch, and the openings 7, etc. may be 1/8 inch or larger, in accordance with the particular installation involved. While the pressure fluid may be water or oil, usually it is desirably of a viscosity greater than oil, and may be, for instance, a lubricating grease such as used in heavy duty bearings, or it may be a thinned putty composition, or in some cases, a plastic of synthetic resin character, as for instance "silicone" resins, and if further it be of quick-setting property such as to solidify firmly within some hours after being forced into place, added permanency is obtained. Thus, a catalyzed phenolic or resorcin or urea resin or low heat setting resin may be used.

Figure 2:
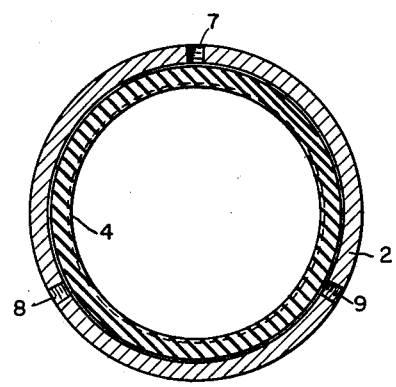
Fig. 2 is a transverse section taken on a plane substantially as indicated by line II—II, Fig. 1.
Figure 3:
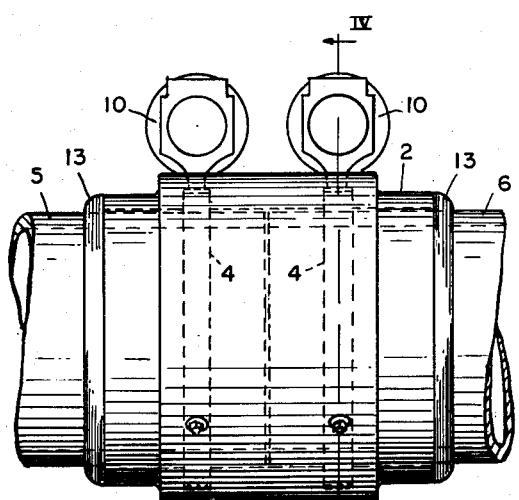
Fig. 3 is a side elevational view showing pipe ends as united by the use of such sleeve.
Figure 4:
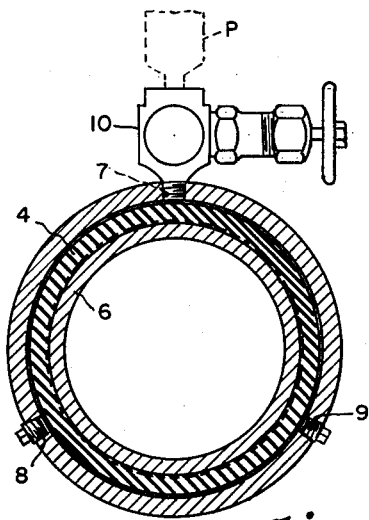
Fig. 4 is a transverse sectional view taken on a plane as indicated substantially by line IV—IV, Fig. 3.

With a sleeve having three tapped openings, as in Fig. 2, for instance, the force pump or gun may be connected to any of the openings, as opening 8, and the pressure fluid or grease is pumped into the annular space outside the compression ring until it appears at the other openings 9 and 7. The valve and pressure gun will then be removed from the opening 8 and a plug is screwed in. Then the valve and force pump is connected to the next hole, 9, and the pressure fluid is forced in until it again issues from the remaining opening 7. The valve and pump assembly is then removed from the opening 9 and a steel plug is screwed in. Finally, the valve and pump assembly is connected to opening 7, and the full pressure is exerted, after which the needle valve 10 is closed and the pump is disassembled therefrom. This results in the forcing and compressing of the ring tightly against the pipe, and in sealing relation with the sleeve. Similarly, the other annular member 4 is compresed by successively connecting the valve and pressure pump at the openings in the sleeve, two of the openings being plugged with the plugs as afore-noted as the pump assembly is removed, until the final application of pressure at the last of the openings, a needle valve being here left in closed condition when the pump is removed. The assembly then is as indicated in Fig. 3, the openings other than those controlled by the valves being closed by screw plugs. In this state, the end faces 12 of the sleeve 2 may receive a final welding operation, forming a fillet weld 13 between the end of the sleeve and the pipe. The welding step may be performed at any convenient time, immediately or after an extended delay, or in some cases of temporary installations or low pressure requirements, it may be omitted. After welding, the pressure valve can be removed, and a plug be inserted if desired. In the repair of pipe lines carrying oil or gasoline or gas, it is thus particularly advantageous to be able to make repairs on an operating line where a leak may have developed. For this, the pipe is exposed at the site of the leak, and the pipe line control valves at each side of the site of the leak being closed, a section of the pipe involving the leak is cut and removed. A new replacement section, together with sleeves as aforedescribed, is then assembled in the line, and the compression rings of the sleeves are compressed into their sealing position by the application of the force pump and pressure medium described, and the line may then be put back into service, the sleeves being able to maintain the assemblage even though not immediately welded. The oil or gasoline which has saturated the soil at the region of the pipe line leak may then be given sufficient time to eliminate the inflammable vapors, and the welding of the fillet 13 may follow at such later time as convenient. As readily apparent to those dealing with pipe line repairs, this obviates the fire and explosion dangers which have heretofore been serious in efforts at repairs which include welding during the escape of inflammable vapors. Furthermore, not only may the welding be delayed until vapors have been thoroughly dissipated, but even in the case of welding generally, the hazards of the previous expedients which involved "mud packing" of the ends of the pipe where the weld was to be made or the use of rubber vapor-packs, are eliminated.

Figure 5:
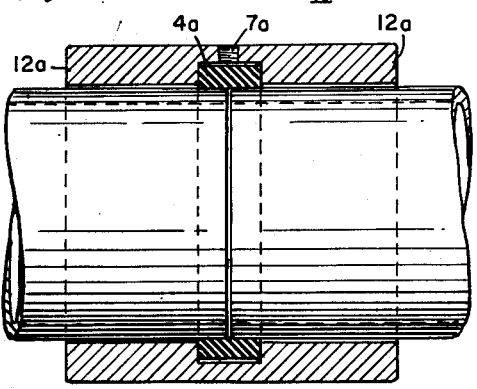
Fig. 5 is an axial sectional view of a modification.

While sleeves equipped with two or pairs of two compression rings are desired for pipes where the operating pressure is on the order of several hundred pounds per square inch, on piping operated under lower pressures, a single compression ring 4a, Fig. 5, of width sufficient to lap over both ends of the aligned pipes may be employed. Again, in this case, one or more tapped openings 7a permit connection of the force pump and the sealing plugs. Again, with this form, the welding at the ends 12a may be delayed as long as desired, or may be omitted where the installation is of temporary character or where operating pressures are relatively low.

With sleeves having either two compression rings or one compression ring, by employing a self-setting plastic as the pressure medium, as afore-indicated, a further advantage is had that an installation may be made and the compression be completed, and with the line out of operation and the plastic set, the needle valve initially employed may be removed and a closure plug be substituted.

Other modes of applying the principle of the invention may be employed, change being made as regards the detail described, provided the features stated in any of the following claims, or the equivalent of such, be employed.

I therefore particularly point out and distinctly claim as my invention:

1. A device for establishing a temporary connection between two abutting pipes of a pipeline which can subsequently be rendered into a permanent connection, comprising a metal sleeve having two annular grooves on the interior periphery thereof and longitudinally spaced from each other so that each groove may overlie a pipe near its end when the sleeve is positioned over the two abutting pipes to be connected, an elastic compressible ring in each groove, said sleeve having a plurality of spaced openings connecting with each groove permitting pressure to be applied against said elastic rings to seal them against said pipes to provide a temporary connection permitting the pipeline to be restored to service, and a longitudinally extending flange on each end of said sleeve extending a substantial distance beyond said ring containing grooves, and having an inside diameter substantially uniform with the portion of the sleeve containing said rings, whereby the end of said flanges may be welded to the pipes subsequent to said temporary connection to provide a permanent connection for the pipes while the pipe is in service without disturbing the temporary seal provided by said rings before the welding is concluded.

2. A device for establishing a temporary connection between two abutting pipes of a pipeline which can subsequently be rendered into a permanent connection, comprising a metal sleeve having two annular grooves on the interior periphery thereof and longitudinally spaced from each other so that each groove may overlie a pipe near its end when the sleeve is positioned over the two abutting pipes to be connected, an elastic compressible ring in each groove, said sleeve having a plurality of circumferentially spaced openings connecting with each groove and through which a fluid under pressure may be introduced, whereby said elastic rings are compressed and sealed against said pipes to provide a temporary connection permitting the pipeline to be restored to service, means for closing said openings after the fluid has been introduced under pressure, and a longitudinally extending flange on each end of said sleeve extending a substantial distance beyond said ring containing grooves, and having an inside diameter substantially uniform with the portion of the sleeve containing said rings, whereby the end of said flanges may be welded to the pipes subsequent to said temporary connection to provide a permanent connection for the pipes while the pipe is in service without disturbing the temporary seal provided by said ring before the welding is concluded.

JOSEPH B. SMITH.

REFERENCES CITED

The following references are of record in the file of this patent:

UNITED STATES PATENTS

| Number | Name | Date |
|---|---|---|
| 114,945 | Hyatt | May 16, 1871 |
| 1,285,430 | Sheppy | Nov. 19, 1918 |
| 1,631,406 | Eisenhauer | June 7, 1927 |
| 1,690,562 | Trout | Nov. 6, 1928 |
| 1,800,085 | Kroeger et al. | Apr. 7, 1931 |
| 1,835,010 | Burnish | Dec. 8, 1931 |
| 2,002,577 | Ice | May 28, 1935 |
| 2,369,770 | Baxter | Feb. 20, 1945 |